United States Patent [19]
Hoft et al.

[11] Patent Number: 5,689,164
[45] Date of Patent: Nov. 18, 1997

[54] RESONANT POWER ELECTRONIC CONTROL OF SWITCHED RELUCTANCE MOTOR

[75] Inventors: Richard Gibson Hoft, Columbia, Mo.; Tatsuya Uematsu, Kariya, Japan

[73] Assignee: Kabushiki Kaisha Toyoda Jidoshokki Seisakusho, Kariya, Japan

[21] Appl. No.: 569,460

[22] Filed: Dec. 8, 1995

[51] Int. Cl.$^6$ ............................................. H02P 7/05
[52] U.S. Cl. ............................................. 318/701; 318/254
[58] Field of Search ............................................. 318/138, 254, 318/439, 685, 696, 701

[56] References Cited

U.S. PATENT DOCUMENTS 5,115,181  5/1992  Sood ........................................ 318/701
5,296,785  3/1994  Miller ...................................... 318/254
5,327,069  7/1994  Radun et al. ........................... 318/701 X
5,446,359  8/1995  Horst ....................................... 318/701

*Primary Examiner*—Bentsu Ro
*Attorney, Agent, or Firm*—Brooks Haidt Haffner & Delahunty

[57] ABSTRACT

An inductor-capacitor series resonant circuit is connected in series with a thyristor or other unidirectionally conductive semiconductor switch to form a resonant network, one resonant network for each stator phase winding of a switched reluctance motor to be connected in parallel to the stator phase winding. Zero current switching is achieved by selecting the resonant frequency such that the inductor and capacitor resonate in a time period during both turn-on and turn-off of the semiconductor switches. A C-dump circuit is included in one embodiment for increased power transfer efficiency.

6 Claims, 9 Drawing Sheets

RESONANT POWER ELECTRONIC CONTROL OF SWITCHED RELUCTANCE MOTOR

BACKGROUND OF THE INVENTION

1. Field of the Invention

This invention relates to power electronic control of switched reluctance motors and the like and more particularly to resonant current controlled converters for such motors.

2. Description of the Related Art

Switched reluctance motors have been studied vigorously all over the world for a wide range of industrial applications. The switched reluctance motor (SRM) has a simple rotor construction and simpler stator windings than in conventional AC machines. Thus, the SRM is expected to be lower in cost, at least equal or better in efficiency and torque per unit volume than its strongest competitors—the squirrel cage induction motor and the permanent magnet synchronous machine.

The SRM consists basically of a doubly salient variable reluctance motor fed by a unipolar power converter. In the SRM both stator and rotor have salient poles. Several combinations of stator and rotor poles are possible such as 6-4 and 8-6. All motor phase windings are wound on stator poles, and the rotor is made simply of laminated steel with no windings and no permanent magnets. Because of the robust rotor construction and the absence of brushes, sustained high speed operation is possible. The structures of converters feeding SRM's are usually simpler than inverters feeding AC motors because only unidirectional currents are required. Positive torque is produced by sequentially applying current pulses to the motor phase windings during the periods when their inductance is increasing. Because of the doubly salient structures of the stator and the rotor, the motor phase inductances are high and their values vary over a wide range with the rotor position. Therefore, the phase current regulator must be sufficiently fast to respond to the fast variation of motor phase inductance at high speeds. In typical converters for feeding an SRM where conventional switching techniques are used, the stress imposed on the power switches increases when the switching frequency is increased. Therefore, problems such as overheating of switching devices and deterioration of converter efficiency are caused by switching losses as switching frequency is increased.

There is a need for an SRM power converter which can achieve higher frequency current switching to improve the performance of SRM's.

In the same general category as the SRM, which is also known as a variable reluctance motor (VRM) or electronically commutated reluctance motor (ECRM), is the variable reluctance stepper motor (VRSM). The need for improved performance exists for all of the foregoing devices. It should be understood that unless the context indicates otherwise, "switched reluctance motor" is intended to encompass the above-mentioned devices generically.

SUMMARY OF THE INVENTION

In accordance with the present invention, an inductor-capacitor resonant network is connected in series with a resonant switch and in parallel with each motor phase winding. Auxiliary circuits are included in the resonant network to modify the converter configuration according to the operating modes (conducting period and commutation period). Each auxiliary circuit is formed by a switchable semiconductor device such as a thyristor or the like in parallel with a diode which combination is connected in series with an inductor-capacitor resonant circuit.

During conducting periods, the motor phase winding current must be regulated in order to establish the developed motor torque at a desired value. This can be done with a modulation scheme (pulse width or frequency modulation) in which the semiconductor devices are turned on and off at a high frequency. The switchings of the semiconductor devices occur at zero-current which minimizes switching losses. A sinusoidal resonant current flows through each semiconductor device so that the semiconductor device currents are zero at turn-on and turn-off. On the other hand, during commutation periods, the current in the off-going phase must be reduced to zero as fast as possible. During these periods, a C-dump technique may be used in which the stored energy in the motor phase winding is returned to the DC bus.

BRIEF DESCRIPTION OF THE DRAWINGS

For a fuller understanding of the nature and advantages of the present invention reference should be made to the following detailed description taken in conjunction with the accompanying drawings, in which.

DESCRIPTION OF THE PRESENTLY PREFERRED EMBODIMENTS

Figure 6:
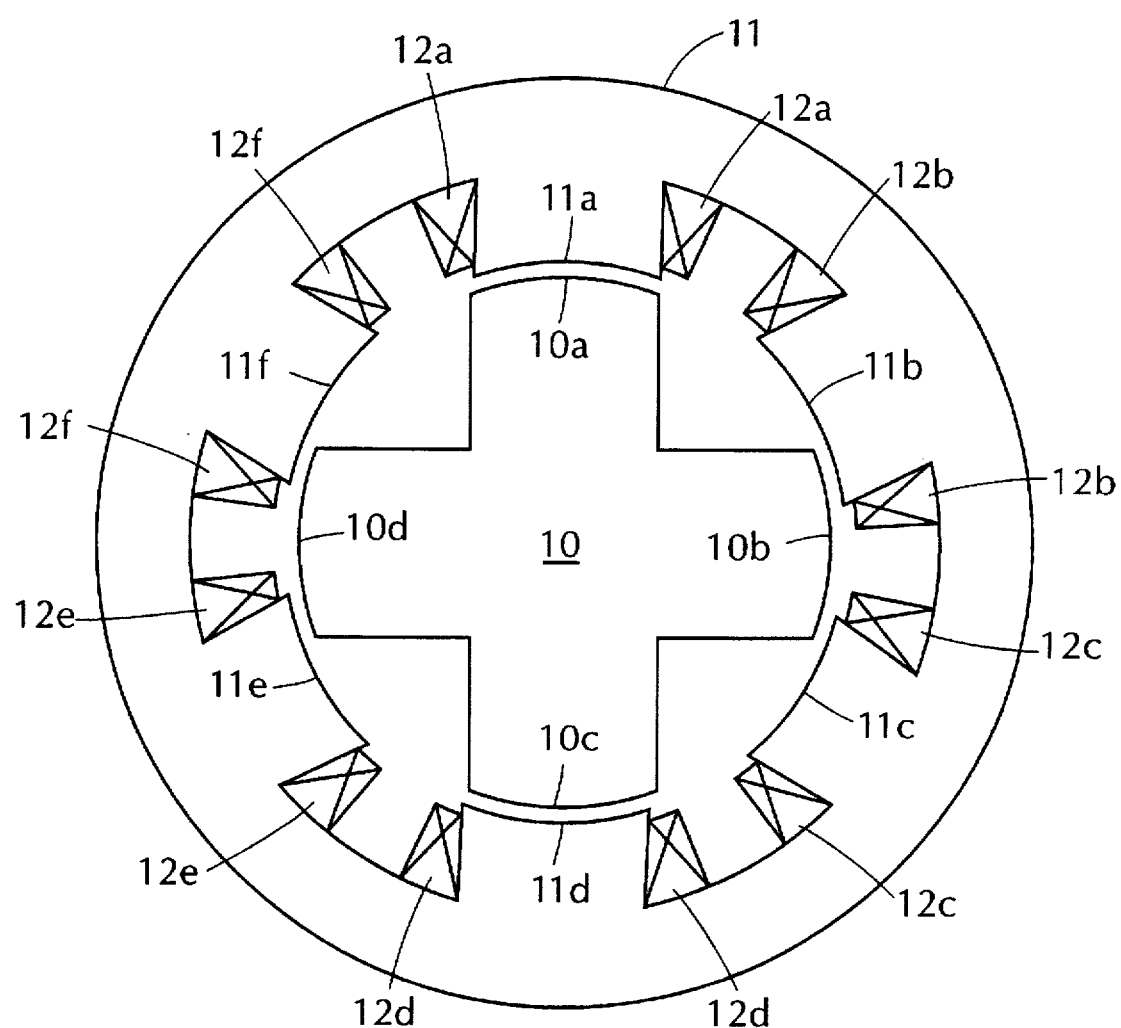
FIG. 6 is a diagrammatic representation of a typical switched reluctance motor to which the present invention is applicable.

Referring first to FIG. 6, there is shown diagrammatically the essential components of a switched or variable reluctance motor. The illustrated motor has a rotor 10 with four salient poles 10a, 10b, 10c and 10d, cooperating with a stator 11 having six salient poles, 11a, 11b, 11c, 11d, 11e and 11f. Each of the stator poles is provided with a winding 12a to 12f, respectively. The windings 12a and 12d are connected in series for a first phase; the windings 12b and 12e are connected in series for a second phase; and the windings 12c and 12f are connected in series for a third phase, and are energized in sequence to cause rotation of the armature. If it is assumed that the rotor 10 is rotating clockwise as seen in FIG. 6, the first field phase involving windings 12a and 12d will, at the instant shown when rotor poles 10a and 10c are aligned with poles 11a and 11d, have maximum inductance. Since rotor poles 10b and 10d are departing from alignment with stator poles 11b and 11e, the second phase associated with windings 12b and 12e will be characterized by a decreasing inductance. At the same time the inductance of the third phase windings 12c and 12f will be increasing.

During operation of the motor when a particular phase winding of the stator is energized the nearest poles of the rotor will attempt to align with the stator poles associated with the energized winding. By sequentially energizing each phase of the stator, the rotor can be caused to rotate. The overall operation of this type of motor is believed to be well known, and the present invention is directed to circuits for controlling the energization thereof. If pulses are supplied continually to the motor, the motor will run continuously. However, if a selected number of pulses are supplied, the motor will operate as a stepper motor rotating to a specific angular orientation.

Figure 1:
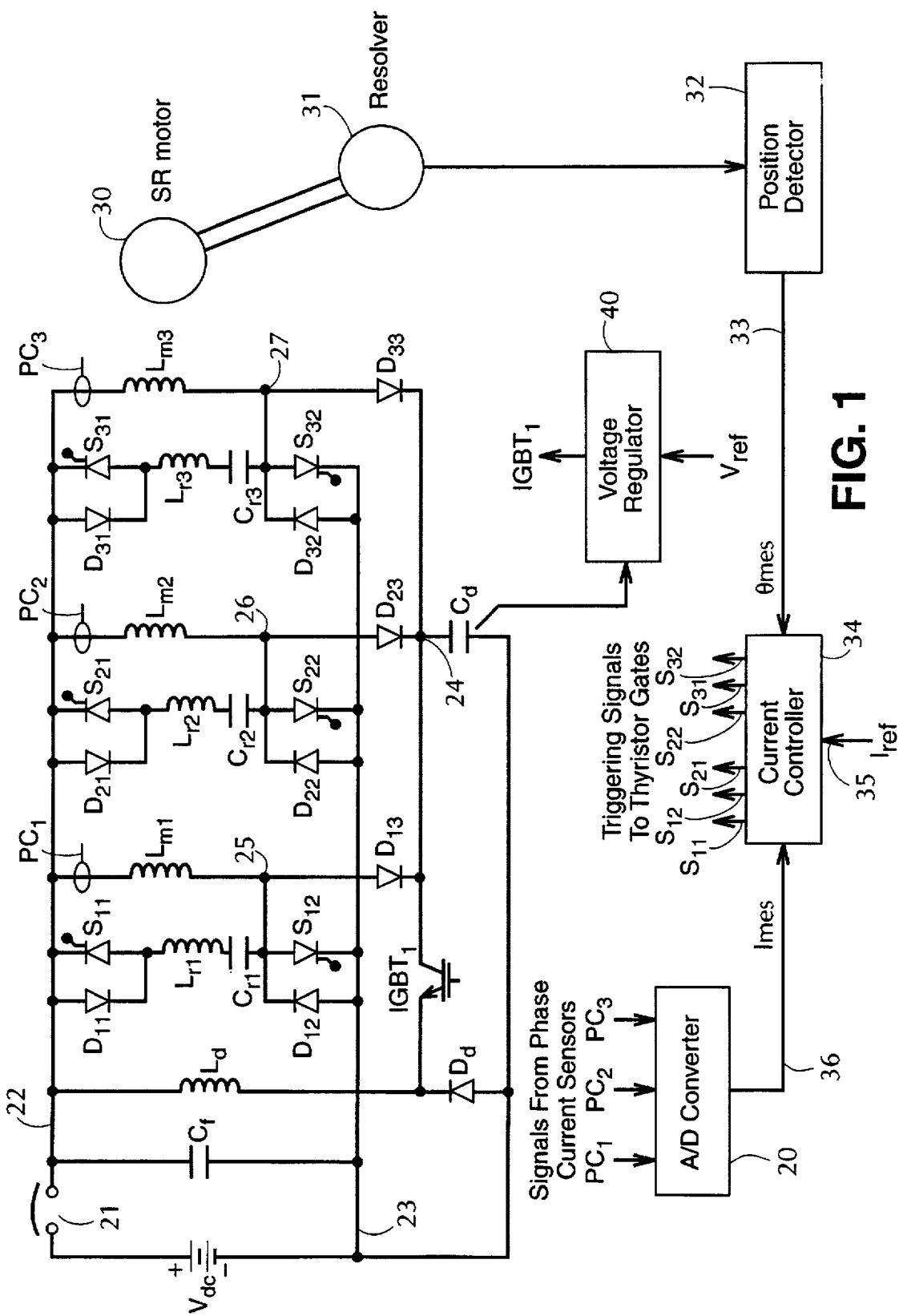
FIG. 1 is a schematic circuit diagram of a presently preferred embodiment of the present invention.

Now refer to FIG. 1 which is a diagram of a first embodiment of a resonant power electronic converter constructed in accordance with the present invention. A three-phase 6-pole stator, 4-pole rotor SRM such as that shown in FIG. 6 is to be controlled. The converter consists essentially of three resonant networks controlled each by an associated resonant switch. In this embodiment each resonant network consists of a capacitor connected in series with an inductor and, in turn, in series with an auxiliary circuit consisting of a thyristor in parallel with a diode. In FIG. 1 the first resonant network consists of inductor $L_{r1}$ in series with capacitor $C_{r1}$ and in series with thyristor $S_{11}$ in parallel with diode $D_{11}$. The first resonant switch for the first resonant network consists of thyristor $S_{12}$ in parallel with diode $D_{12}$. The first motor phase winding is designated $L_{m1}$ and is connected in parallel with the first resonant network. A phase current sensor $PC_1$ is coupled to motor phase winding $L_{m1}$ and has its output coupled to an input to an A/D converter 20.

In similar manner the second resonant network consists of inductor $L_{r2}$ in series with capacitor $C_{r2}$ and in series with thyristor $S_{21}$ in parallel with diode $D_{21}$. The second resonant switch for the second resonant network consists of thyristor $S_{22}$ in parallel with diode $D_{22}$. The second motor phase winding is designated $L_{m2}$ and is connected in parallel with the second resonant network. A phase current sensor $PC_2$ is coupled to motor phase winding $L_{m2}$ and has its output coupled to another input to the A/D Converter 20.

Likewise, the third resonant network is composed of elements $L_{r3}$, $C_{r3}$, $S_{31}$ and $D_{31}$, while the third resonant switch consists of thyristor $S_{32}$ in parallel with diode $D_{32}$. The third motor phase winding is designated $L_{m3}$ and is connected in parallel with the third resonant network, as shown. $PC_3$ is the phase current sensor coupled to winding $L_{m3}$ with an output coupled to a third input to the A/D Converter 20.

A source of direct current voltage $V_{dc}$ is connected through a power switch 21 to a filter capacitor $C_f$ extending between a positive bus 22 and a negative bus 23.

A capacitor dump circuit is provided consisting essentially of an inductor $L_d$ connected in series with a diode $D_d$ and connected between the buses 22 and 23.

A voltage regulator $IGBT_1$ is connected in series with a capacitor $C_d$ across the diode $D_d$. Each motor winding circuit is connected to the junction 24 between capacitor $C_d$ and the $IGBT_1$ by a respective diode $D_{13}$, $D_{23}$ and $D_{33}$ with the diode cathodes connected to junction 24 and the diode anodes connected to the respective junction 25, 26 or 27 between the motor field windings $L_{m1}$, $L_{m2}$, $L_{m3}$ and the capacitors $C_{r1}$, $C_{r2}$, $C_{r3}$.

For the present example it is assumed that the motor winding $L_{m1}$ consists of windings 12a and 12d, winding $L_{m2}$ consists of windings 12b and 12e, while winding $L_{m3}$ consists of windings 12c and 12f.

Auxiliary circuits are included in the resonant networks to modify the converter configuration according to the operating modes (conducting period and commutation period). Each auxiliary circuit is formed by a thyristor in parallel with a diode $S_{11}$–$D_{11}$, $S_{21}$–$D_{21}$, $S_{31}$–$D_{31}$.

The rotor of the motor is shown at 30 connected mechanically to a resolver 31 whose output feeds a position detector 32 having an output 33 connected to a current controller 34 provided with an input 35 of $I_{ref}$, an input 36 provided by the A/D converter 20, and a plurality of outputs $S_{11}$, $S_{12}$, $S_{21}$, $S_{22}$, $S_{31}$ and $S_{32}$ for controlling the thyristor gates. The base of the $IGBT_1$ device is controlled by the voltage regulator 40 as a function of the reference voltage $V_{ref}$ and the voltage across the capacitor $C_d$.

For the SRM, each phase is energized independently. Therefore, analysis can be performed for one phase, and then extended to the other phases. In this analysis, the first phase involving motor phase winding $L_{m1}$ will be considered. The following assumptions are made:

1. The thyristors and diodes are ideal, i.e. there is no ON-state volt drop and the switching time is zero;
2. There are negligible losses in the resonant networks and the motor phase windings; and
3. The power switch 21 connecting the $V_{dc}$ battery to the circuit of FIG. 1 has been closed long enough for the capacitor $C_d$ to be charged to $2V_{dc}$.

Initially all of the thyristors and diodes are assumed to be non-conducting. The circuit operation can be divided into five intervals.

Figure 2A:
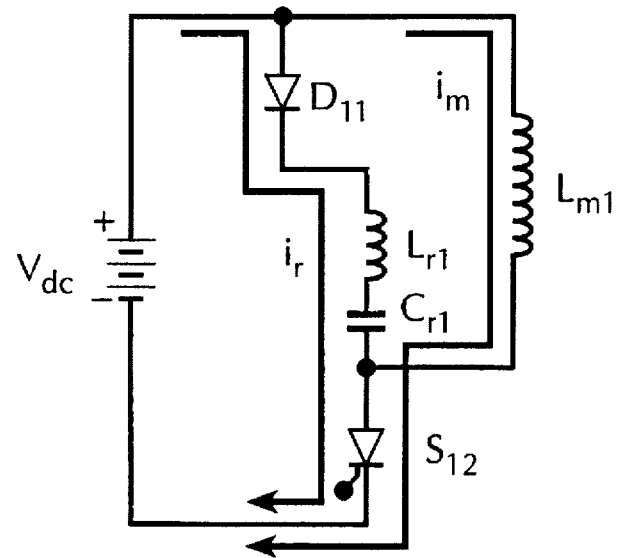
FIG. 2A is an equivalent circuit diagram for Interval 1 useful when explaining the operational theory of the present invention.

Interval 1: FIG. 2A is an equivalent circuit diagram for Interval 1. Start up occurs by gating thyristor $S_{12}$ which applies the DC bus voltage $V_{dc}$ to motor phase winding $L_{m1}$. The motor phase winding current $i_m$ increases linearly with time having a slope of $V_{dc}/L_{m1}$. Also at the moment $S_{12}$ is gated, a half cycle fast resonance, $$\text{resonant frequency} f_{FR} = (2\pi \sqrt{L_{r1}C_{r1}})^{-1}$$

occurs charging capacitor $C_{r1}$ to $2V_{dc}$ positive at its upper terminal through diode $D_{11}$, inductor $L_{r1}$, capacitor $C_{r1}$ and thyristor $S_{12}$. $S_{11}$ is not gated so the $D_{11}$–$L_{r1}$–$C_{r1}$ branch opens when the half cycle resonance ends. The equivalent circuit equations during Interval 1 are:

$$i_m = \frac{1}{L_{m1}} \int V_{dc} dt \qquad (1)$$

$$V_{dc} = L_{r1}\frac{di_r}{dt} + v_{cr1} \qquad (2)$$

-continued $$v_{cr1} = \frac{1}{C_{r1}} \int i_r dt \qquad (3)$$

Figure 2B:
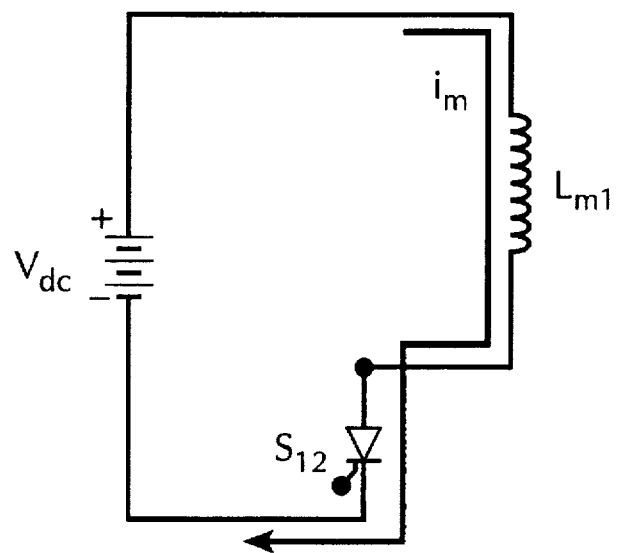
FIG. 2B is an equivalent circuit diagram for Interval 2 in the operation of the present invention.

Interval 2: FIG. 2B is an equivalent circuit diagram for Interval 2. After capacitor $C_{r1}$ has been charged to $2V_{dc}$, the motor phase winding current $i_m$ reaches the reference value $I_{ref}$. The equivalent circuit equation during Interval 2 is:

$$i_m = \frac{1}{L_{m1}} \int V_{dc} dt \qquad (4)$$

Figure 2E:
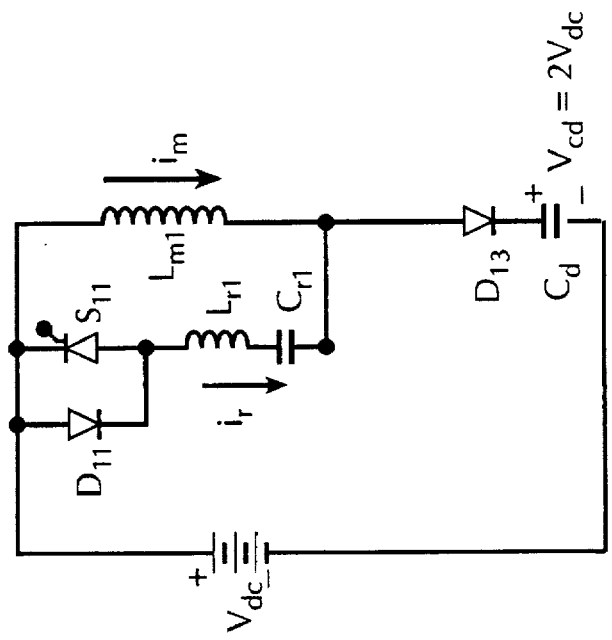
FIG. 2E is an equivalent circuit diagram for Interval 5 in the operation of the present invention.
Figure 2D:
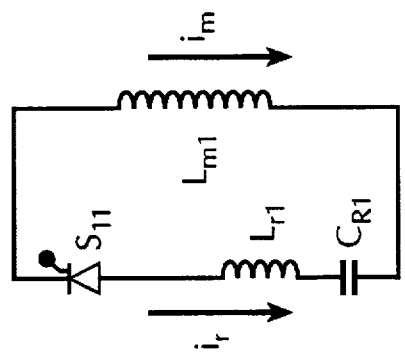
FIG. 2D is an equivalent circuit diagram for Interval 4 in the operation of the present invention.
Figure 2C:
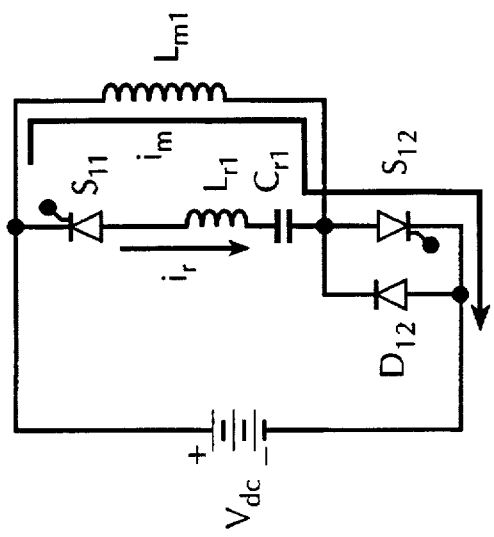
FIG. 2C is an equivalent circuit diagram for Interval 3 in the operation of the present invention.

Interval 3: FIG. 2C is an equivalent circuit diagram for Interval 3. When the motor phase winding current $i_m$ reaches the reference value $I_{ref}$, thyristor $S_{11}$ is gated. This first causes a fast resonance, resonant frequency $$f_{FR} = (2\pi \sqrt{L_{r1} C_{r1}})^{-1}$$

counterclockwise around the loop involving $C_{r1}$–$L_{r1}$–$S_{11}$–$V_{dc}$ and the $D_{12}$–$S_{12}$ branch. The current through $C_{r1}$ upward (negative direction) oscillates up to a value larger in magnitude than the winding current $i_m$. This reduces the current through $S_{12}$ to zero and then diode $D_{12}$ conducts. After the $C_{r1}$ current $i_r$ reaches its peak value of $-V_{dc}\sqrt{C_{r1}/L_{r1}}$, $i_r$ begins to decrease in magnitude. When the negative $i_r$ reduces to a value equal to $i_m$, the $S_{12}$–$D_{12}$ branch opens because $D_{12}$ cannot conduct current downward and $S_{12}$ has been turned off. The equivalent circuit equations during this interval are:

$$i_m = \frac{1}{L_{m1}} \int V_{dc} dt \qquad (5)$$

$$V_{dc} = L_{r1} \frac{di_r}{dt} + v_{cr1} \qquad (6)$$

$$v_{cr1} = \frac{1}{C_{r1}} \int i_r dt \qquad (7)$$

Interval 4: FIG. 2D is an equivalent circuit diagram for Interval 4. During this interval, $S_{12}$ is off and $S_{11}$ is conducting. The motor phase winding current $i_m$ now flows clockwise around the loop involving $L_{m1}$–$C_{r1}$–$L_{r1}$–$S_{11}$. This is a slow resonance, resonance frequency $$f_{SR} = (2\pi \sqrt{(L_{m1} + L_{r1}) C_{r1}})^{-1}$$

which causes capacitor $C_{r1}$ to charge to a negative voltage (positive at the lower terminal of $C_{r1}$). When $C_{r1}$ has charged negatively to the value such that $$V_{dc} + |v_{cr1}| \geq v_{cd} = 2V_{dc} \qquad (8)$$

where $v_{cd}$ is the voltage across capacitor $C_d$, then diode $D_{13}$ will start to conduct ending Interval 4. Note that it is assumed capacitor $C_d$ had been charged to $2V_{dc}$ positive at the upper terminal as stated previously. The equivalent circuit equations during Interval 4 are:

$$v_{cr1} + L_{m1} \frac{di_m}{dt} + L_{r1} \frac{di_r}{dt} = 0 \qquad (9)$$

$$v_{cr1} = \frac{1}{C_{r1}} \int i_r dt \qquad (10)$$

-continued $$i_m = -i_r \qquad (11)$$

Interval 5: FIG. 2E is an equivalent circuit diagram for Interval 5. When diode $D_{13}$ starts to conduct, a net $V_{dc}$ negative voltage is now applied to the motor phase winding $L_{m1}$. Diode $D_{13}$ conducts as long as $i_m + i_r \geq 0$. The motor phase winding current $i_m$ then reduces to the desired value either only a few percent below the reference value $I_{ref}$ during the conducting period, or to zero when the motor phase current is to be turned off. $S_{12}$ would be either turned on again to build up the motor phase winding current to a few percent above the reference value $I_{ref}$ and this process would be repeated during the conducting period, or $S_{12}$ would remain off until the next time $L_{m1}$ is to be energized. The capacitor voltage $v_{cd}$ must be maintained at a desired value. This is done by the IGBT voltage regulator as shown in FIG. 1. The equivalent circuit equations during Interval 5 are:

$$i_m = \frac{1}{L_{m1}} \int (V_{dc} - v_{cd}) dt \qquad (12)$$

$$V_{dc} - v_{cd} = L_{r1} \frac{di_r}{dt} + v_{cr1} \qquad (13)$$

$$v_{cr1} = \frac{1}{C_{r1}} \int i_r dt \qquad (14)$$

Figure 3:
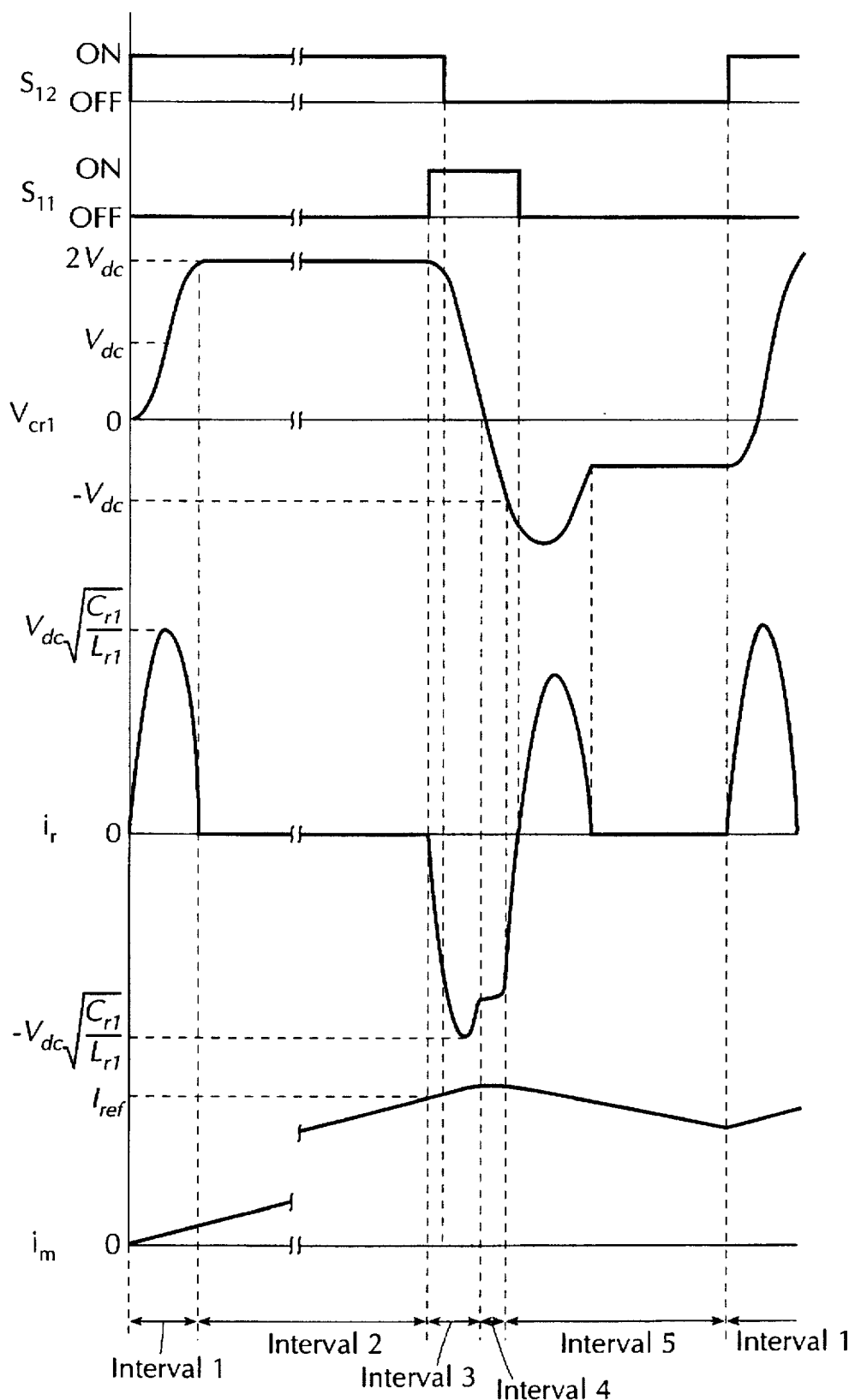
FIG. 3 is a timing graph showing the relationship between the switch states and the voltage and current of the resonant capacitor and the current of the motor phase winding during operation of the present invention.

FIG. 3 is a timing graph showing the relationship between the switch states, the voltage and current of the resonant capacitor and the current of the motor phase winding in the present invention.

The operation of the circuit in FIG. 1 may now be understood. The present invention uses the resonance between the inductor $L_{r1}$ (or $L_{r2}$ or $L_{r3}$) and capacitor $C_{r1}$ (or $C_{r2}$ or $C_{r3}$) to achieve zero-current switching in the thyristor switches $S_{11}$ and $S_{12}$ (or $S_{21}$ and $S_{22}$ or $S_{31}$ and $S_{32}$). A sinusoidal resonant current flows through each thyristor so that the thyristor currents are zero at both turn-on and turn-off which minimizes switching losses.

Figure 4A:
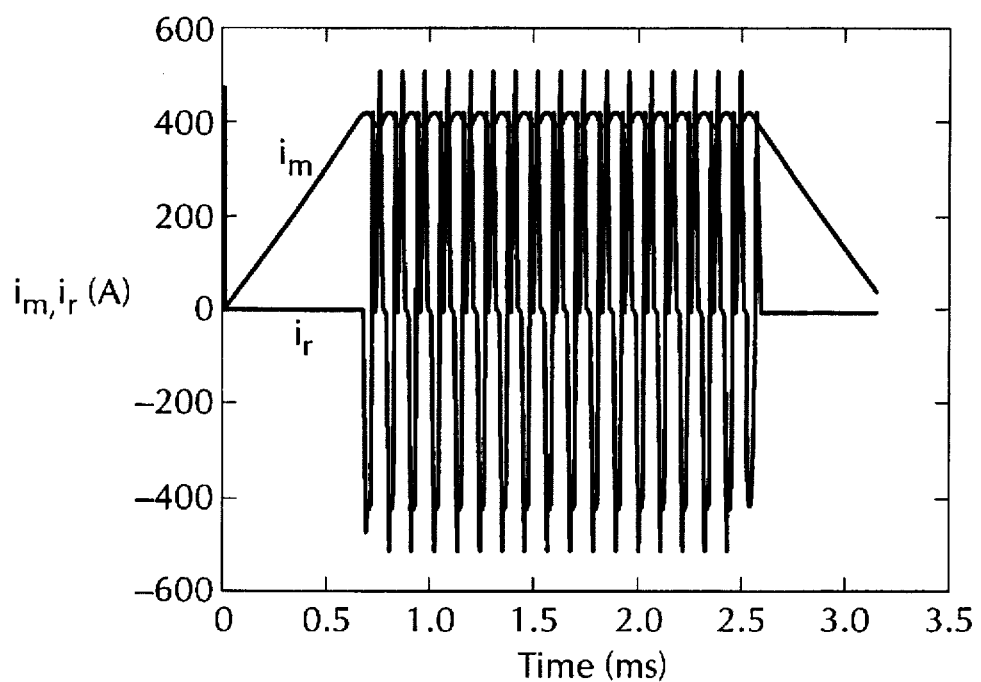
FIG. 4A is a graph of the motor phase winding current $i_m$ and the resonant capacitor current $i_r$ versus time during a single winding excitation pulse for the circuit of the present invention.
Figure 4B:
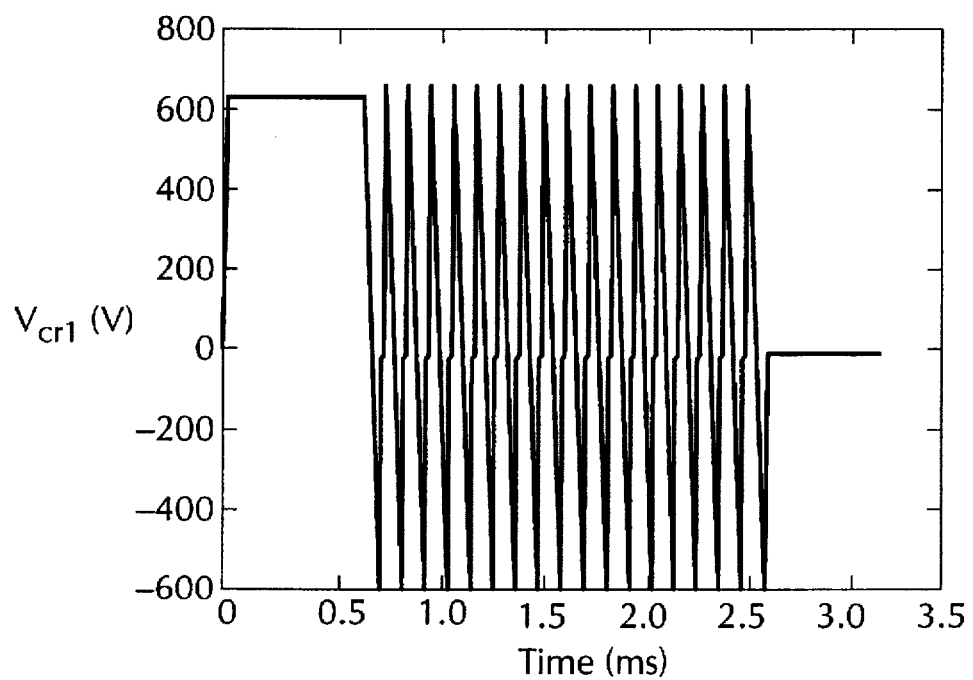
FIG. 4B is a graph of the resonant capacitor voltage $V_{cr1}$ versus time during a single winding excitation pulse for the circuit of the present invention.

FIG. 4A is a graph of the motor phase winding current $i_m$ and the resonant capacitor current $i_r$ versus time during a single winding excitation pulse for the circuit of the present invention. FIG. 4B is a graph of the corresponding capacitor voltage $v_{cr1}$ versus time during the same excitation pulse for the circuit of the present invention. The DC bus voltage ($V_{dc}$) is 312 volts and the motor phase winding reference current ($I_{ref}$) is 400 amperes. The following values of the resonant network elements are selected so that the fast resonant frequency ($f_{FR}$) is 20 kHz.

$$L_{r1} = L_{r2} = L_{r3} = 5.4 \ \mu H$$

$$C_{r1} = C_{r2} = C_{r3} = 12 \ \mu F$$

The remaining circuit constants for the FIG. 1 embodiment are as follows:

$C_d$=10 μF $C_f$=160 μF, and $L_d$=2 mH.

Figure 5:
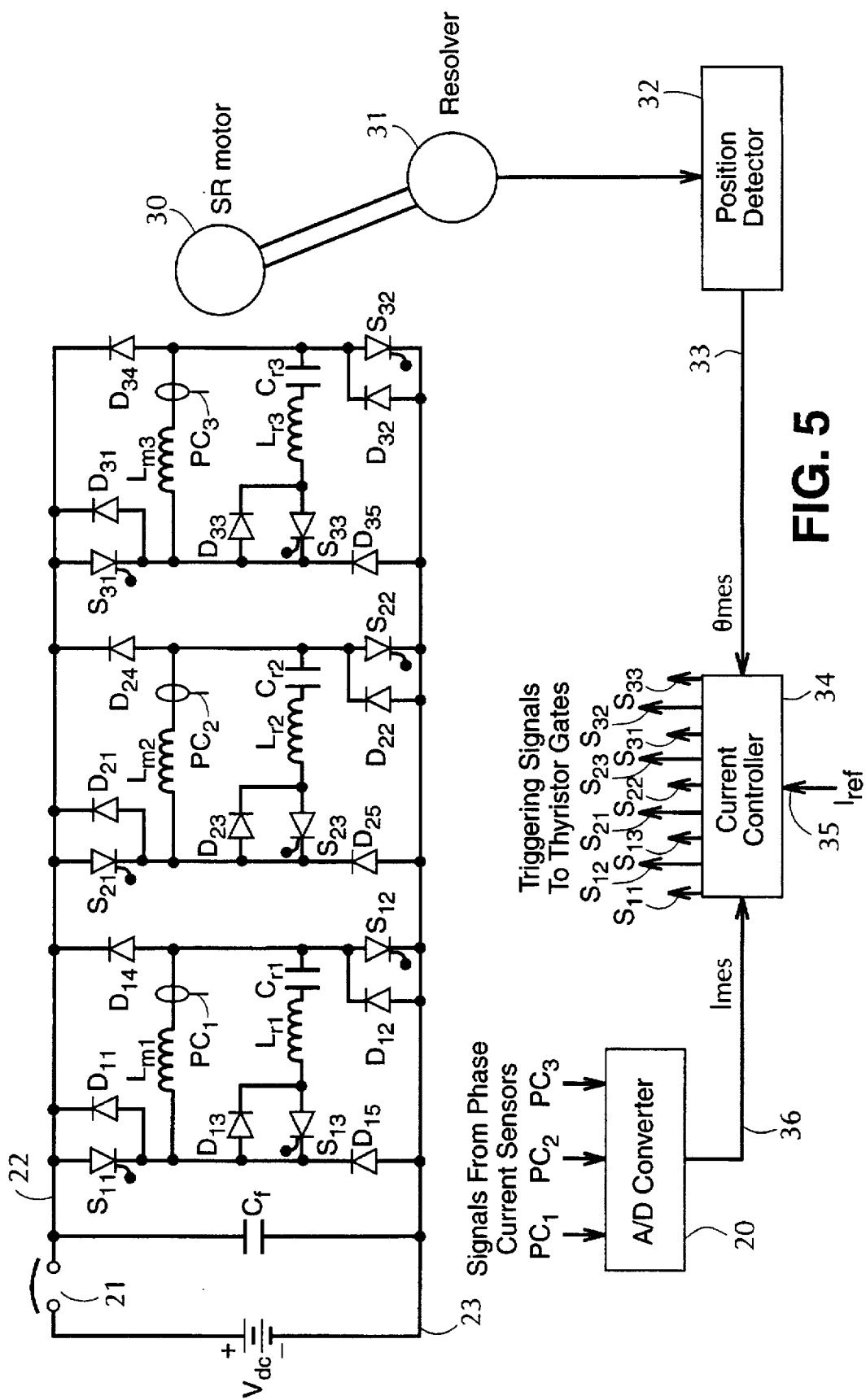
FIG. 5 is a circuit diagram of an alternative embodiment of the present invention.

FIG. 5 shows a circuit diagram of an alternative embodiment of the present invention. The operation of the circuit in FIG. 5 is similar to that of the circuit in FIG. 1. The embodiment in FIG. 5 is a modified bridge circuit with resonant networks and without a C-dump circuit. The motor phase winding $L_{m1}$ (or $L_{m2}$ or $L_{m3}$) is in series with two phase leg switches $S_{11}$ and $S_{12}$ (or $S_{21}$ and $S_{22}$ or $S_{31}$ and $S_{32}$), providing valuable protection against faults. The upper ($S_{11}$ or $S_{21}$ or $S_{31}$) and lower ($S_{12}$ or $S_{22}$ or $S_{32}$) switches are switched on together at the start of each motor winding excitation pulse. At the end of the conduction period when both switches are turned off, any stored magnetic energy that has not been converted to mechanical work is returned to the DC bus by the current freewheeling through the diodes $D_{14}$ and $D_{15}$ (or $D_{24}$ and $D_{25}$ or $D_{34}$ and $D_{35}$).

In FIG. 5 the auxiliary circuits in the resonant networks consist of thyristor $S_{13}$ in parallel with diode $D_{13}$ for the first phase, thyristor $S_{23}$ in parallel with diode $D_{23}$ for the second phase, and thyristor $S_{33}$ in parallel with diode $D_{33}$ for the third phase. Instead of one, there are now two resonant switches employed in tandem for each phase. As explained above, phase winding $L_{m1}$ is in series with thyristor switches $S_{11}$ and $S_{12}$ which are shunted, respectively, by diodes $D_{11}$ and $D_{12}$. In similar fashion, parallel pairs $S_{21}-D_{21}$ cooperate with $S_{22}-D_{22}$ to control winding $L_{m2}$, while $S_{31}-D_{31}$ cooperate with $S_{32}-D_{32}$ to control winding $L_{m3}$. Phase sensors $PC_1$, $PC_2$ and $PC_3$ cooperate with the phase windings and supply signals to the A/D Converter 20 in the same way as in the embodiment of FIG. 1.

The embodiments described above with reference to FIGS. 1 and 5 employ thyristors, however, the invention can be applied to other switchable semiconductor devices, such as MOS devices, IGBT devices, and other types of transistors.

Figure 7:
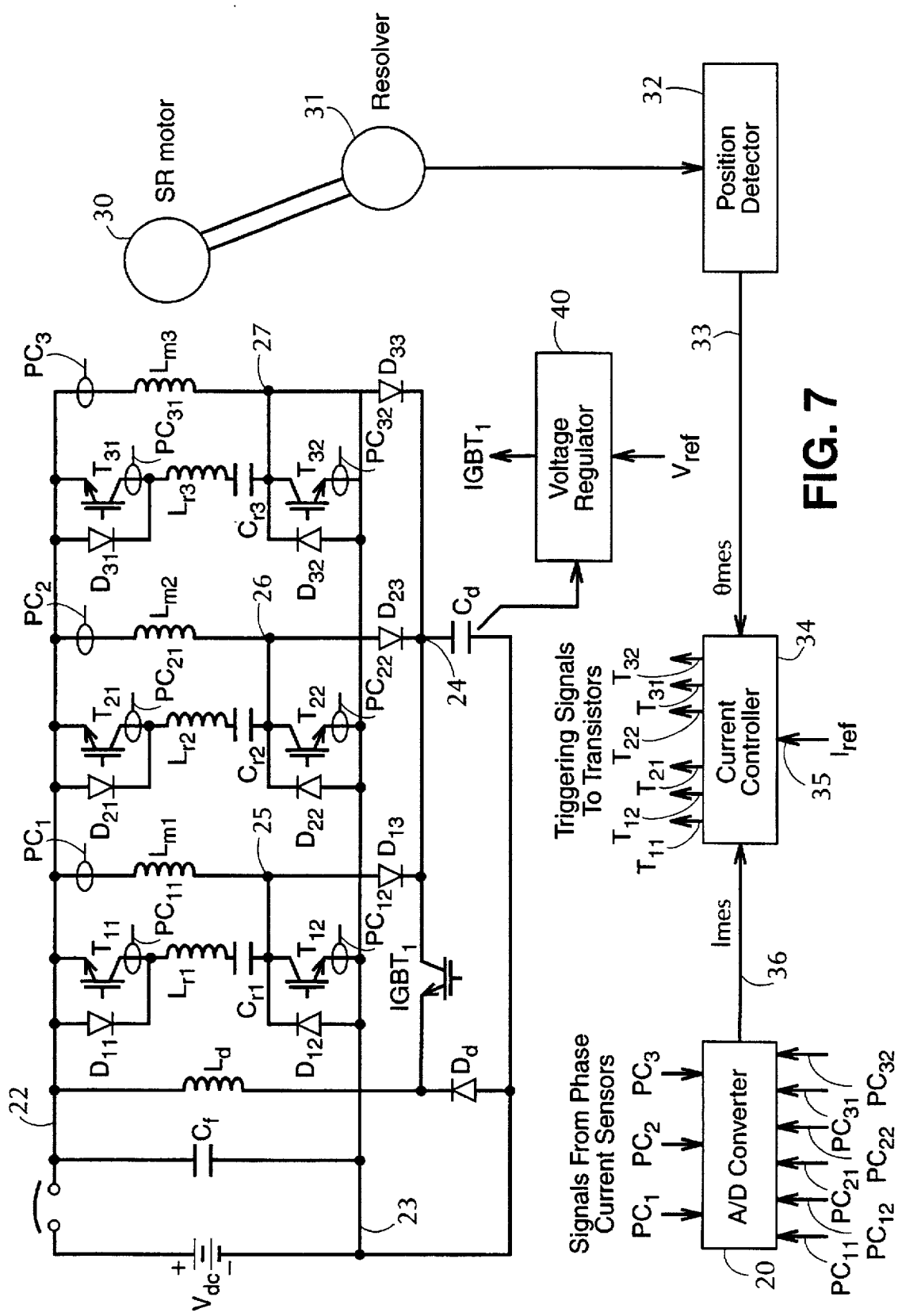
FIG. 7 is a schematic circuit diagram of another embodiment of the present invention.

Reference should now be had to FIG. 7 wherein the thyristors of FIG. 1 have been replaced by IGBT devices $T_{11}$, $T_{12}$, $T_{21}$, $T_{22}$, $T_{31}$ and $T_{32}$. In addition, in order to provide for zero current switching, current sensors $PC_{11}$, $PC_{12}$, $PC_{21}$, $PC_{22}$, $PC_{31}$ and $PC_{32}$ are provided coupled to the respective source or drain electrodes as shown in the drawing and provided with outputs connected to the A/D converter 20. In all other respects, the circuit of FIG. 7 is the same as that shown in FIG. 1. The current sensors $PC_{11}$ to $PC_{32}$ determine the precise moment when current through the associated semiconductor device reaches zero.

As with the embodiments of FIGS. 1 and 5, the embodiment of FIG. 7 is used to drive an SR (switched reluctance) motor whose rotor 30, in turn, drives a resolver 31 and position detector 32 to furnish a feedback signal to the current controller 34. In known manner the controller 34 supplies signals to trigger the transistors in appropriate sequence and timing to cause continuous operation of the motor 30.

Figure 8:
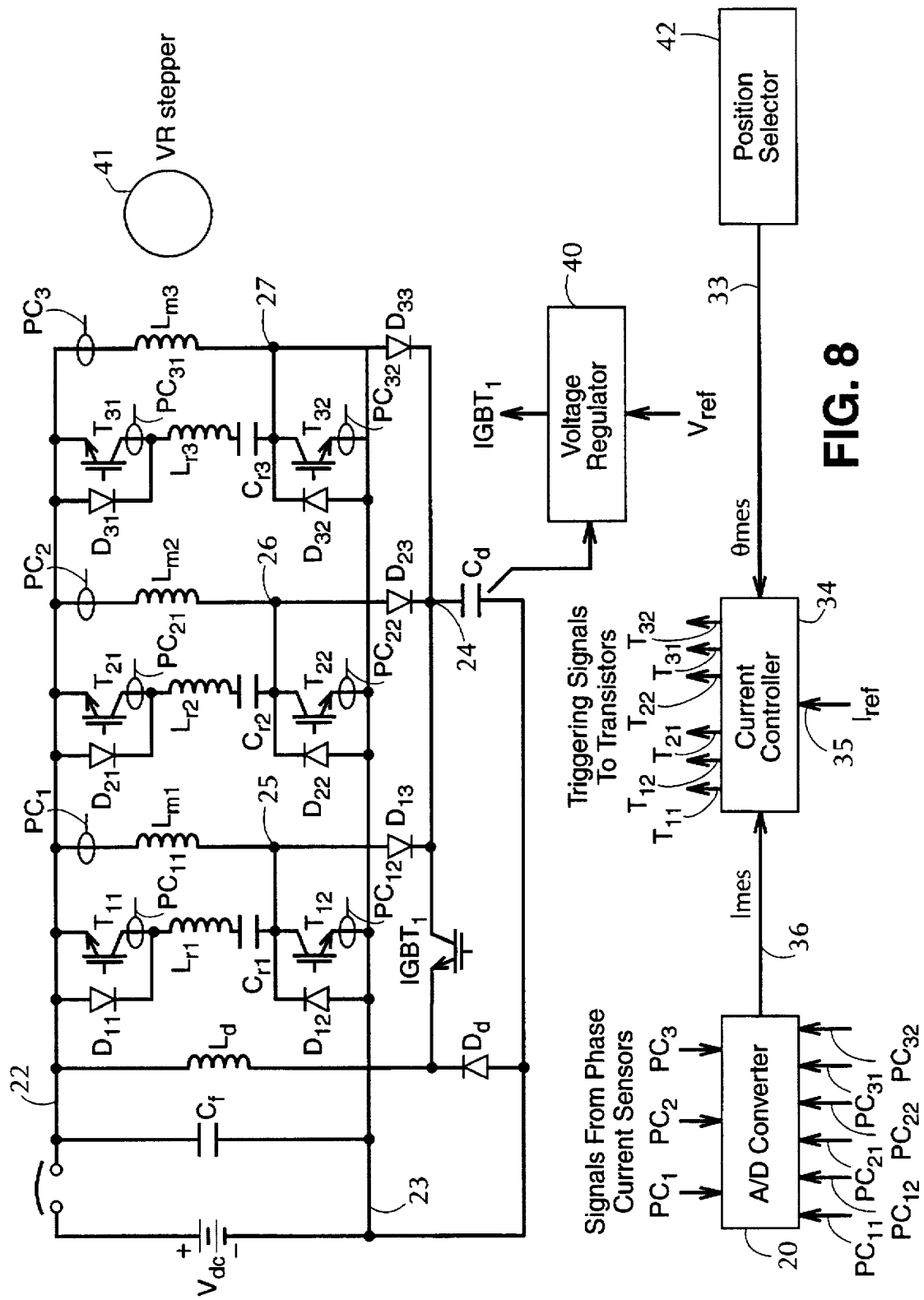
FIG. 8 is a schematic circuit diagram illustrative of a modification of all of the other embodiments.

The invention is also applicable to driving a VR stepper motor 41 as shown in FIG. 8. The circuit in FIG. 8 is the same as in FIG. 7, except that the resolver 31 has been omitted, and the position detector 32 has been replaced with a position selector 42. The operation should be readily apparent.

It should be understood that the circuits of FIGS. 1 and 5 can also be used to drive a stepper motor. In such case the resolver 31 will be omitted and the position detector 32 will be replaced by a suitable selector.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An electronic power converter for delivering power to and controlling a switched reluctance motor having a plurality of stator phase windings, said converter comprising in combination: first and second terminals for connection, respectively, to the positive and negative terminals of a source of DC power; for each of said stator phase windings:

a respective resonant network in which an inductor is connected in series with a capacitor to form a series resonant circuit which is connected in series with a first unidirectionally conductive semiconductor switch, and a first diode is connected in parallel across said first semiconductor switch poled in the inverse direction to that of the first semiconductor switch;

means for connecting said resonant network in parallel to a respective one of said motor stator windings; and a second unidirectionally conductive semiconductor switch connected in inverse parallel to a second diode;

said first semiconductor switch having anode or drain, cathode or source, and gate electrodes, with said anode or drain being connected to a first end of said series resonant circuit, and said cathode or source being coupled to said first terminal;

said second semiconductor switch having anode or drain, cathode or source, and gate electrodes, with said second semiconductor anode or drain being connected to a second end of said series resonant circuit that is remote from said first semiconductor switch, and said second semiconductor cathode or source being coupled to said second terminal;

and means coupled to said gate electrodes for controlling the conductivity of said semiconductor switches.

2. An electronic power converter according to claim 1, further comprising a C-dump circuit for recovering residual energy from said stator phase windings for reuse by said converter.

3. An electronic power converter according to claim 2, wherein said means for controlling the conductivity of said semiconductor switches comprises a plurality of current sensors of which at least one sensor is provided for each of said stator phase windings for coupling responsively thereto, and control means having inputs coupled responsively to said current sensors and having outputs coupled to said gate electrodes of said semiconductor switches.

4. An electronic power converter according to claim 1, wherein said means for controlling the conductivity of said semiconductor switches comprises a plurality of current sensors of which at least one sensor is provided for each of said stator phase windings for coupling responsively thereto, and control means having inputs coupled responsively to said current sensors and having outputs coupled to said gate electrodes of said semiconductor switches.

5. An electronic power converter according to claim 2, wherein said C-dump circuit comprises a third diode with its anode connected to said second terminal and its cathode connected in series with a second inductor to said first terminal, a second capacitor connected between said second terminal and a junction point, an IGBT device coupled between said junction point and the junction between said second inductor and said third diode, and for each of said stator phase windings a separate diode with its cathode connected to said junction point and with its anode connected to the anode or drain of the respective second semiconductor switch, and voltage regulator means coupled thereto for controlling the conduction of said IGBT device as a function of the voltage stored in said second capacitor.

6. An electronic power converter according to claim 1, wherein for each of said stator phase windings there is a third unidirectionally conductive semiconductor switch in inverse parallel to a third diode connected between said first terminal and said cathode or source of said respective first semiconductor switch with the anode or drain of said third semiconductor switch connected to said first terminal, a fourth diode has an anode connected to said second terminal and has a cathode connected to the cathode or source of said respective third semiconductor switch, and a fifth diode has a cathode connected to said first terminal and has an anode connected to the anode or drain of said respective second semiconductor switch.

* * * * *